United States Patent
Liu et al.

(10) Patent No.: US 9,467,965 B2
(45) Date of Patent: Oct. 11, 2016

(54) POSITIONING DATA DISTRIBUTION APPLIED TO SERVER-BASED POSITIONING SYSTEM

(71) Applicant: MARVELL WORLD TRADE LTD., St. Michael (BB)

(72) Inventors: BoChih Liu, Shanghai (CN); Zhike Jia, Fremont, CA (US); Jing Yu, Shanghai (CN); Yuan Ren, Shanghai (CN); Jian Chen, Shanghai (CN)

(73) Assignee: Marvell World Trade Ltd., St. Michael (BB)

( * ) Notice: Subject to any disclaimer, the term of this patent is extended or adjusted under 35 U.S.C. 154(b) by 177 days.

(21) Appl. No.: 14/453,263

(22) Filed: Aug. 6, 2014

(65) Prior Publication Data

US 2015/0050948 A1   Feb. 19, 2015

Related U.S. Application Data

(60) Provisional application No. 61/865,751, filed on Aug. 14, 2013.

(51) Int. Cl.
*H04W 24/00* (2009.01)
*H04W 64/00* (2009.01)

(52) U.S. Cl.
CPC .................... *H04W 64/00* (2013.01)

(58) Field of Classification Search
CPC .................................................. H04W 64/00
USPC ....... 455/456.1, 456.3, 414.1, 507, 404, 416
See application file for complete search history.

(56) References Cited

U.S. PATENT DOCUMENTS

| | | | | |
|---|---|---|---|---|
| 7,359,718 B2* | 4/2008 | Tao | ...................... | G01S 5/0252 455/414.1 |
| 9,264,874 B2* | 2/2016 | Fraccaroli | .............. | G06Q 50/01 |
| 2004/0203885 A1* | 10/2004 | Quaid | .................. | H04W 64/00 455/456.1 |
| 2011/0317579 A1* | 12/2011 | Jones | ........................ | G01S 5/02 370/252 |
| 2012/0149415 A1* | 6/2012 | Valaee | .................. | H04W 64/00 455/507 |
| 2013/0225199 A1* | 8/2013 | Shaw | .................... | H04W 24/00 455/456.1 |
| 2014/0011518 A1* | 1/2014 | Valaee | .................. | G01S 5/0252 455/456.1 |
| 2014/0194145 A1* | 7/2014 | Do | ......................... | G01S 5/0252 455/456.3 |
| 2014/0221013 A1* | 8/2014 | Vaccari | ................. | H04W 4/028 455/456.3 |

* cited by examiner

*Primary Examiner* — David Q Nguyen (57) ABSTRACT

Aspects of the disclosure provide a method for positioning data management. The method includes checking a reset condition that is used to trigger a reset of boundaries of signal strength values for clustering a group of positioning data associated with a wireless station into subsets. Each positioning data associates position information of a location with an identifier of the wireless station for providing wireless connection at the location and a strength of a signal received at the location. Further, the method includes updating, when the reset condition is satisfied, one or more boundaries to re-allocate the group of positioning data in order to increase a population uniformity across the subsets, and storing the updated boundaries.

20 Claims, 5 Drawing Sheets

FIG. 1

| LOCATION (LATITUDE, LONGITUDE) (GPS) | WIRELESS FINGERPRINTS (WIRELESS STATION ID, RSSI) |
|---|---|
| LOCATION 1 (LAT-1, LON-1) | (WS-A, 50) |
| LOCATION 2 (LAT-2, LON-2) | (WS-A, 90) |
| LOCATION 3 (LAT-3, LON-3) | (WS-A, 40) (WS-B, 20) |
| LOCATION 4 (LAT-4, LON-4) | (WS-A, 20) (WS-B, 35) |
| LOCATION 5 (LAT-5, LON-5) | (WS-B, 80) |
| LOCATION 6 (LAT-6, LON-6) | (WS-B, 90) |
| LOCATION 7 (LAT-7, LON-7) | (WS-B, 85) |
| LOCATION 8 (LAT-8, LON-8) | (WS-B, 60) |
| LOCATION 9 (LAT-9, LON-9) | (WS-B, 20) (WS-C, 30) |
| LOCATION 10 (LAT-10, LON-10) | (WS-C, 50) |

POSITIONING DATA DISTRIBUTION APPLIED TO SERVER-BASED POSITIONING SYSTEM

INCORPORATION BY REFERENCE

This present disclosure claims the benefit of U.S. Provisional Application No. 61/865,751, "Position Data Distribution Applied to Server Assisted Positioning System" filed on Aug. 14, 2013, which is incorporated herein by reference in its entirety.

FIELD

This disclosure relates generally to positioning database management. More specifically, the disclosure relates to methods and apparatus for performing positioning database management to improve server-based positioning performance for wireless devices in wireless communication networks.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A modern wireless device can incorporate functions of a satellite positioning system receiver, of a cellular transceiver, or of a wireless transceiver. When a wireless device functions as a satellite positioning system receiver, the wireless device can specify a device's position by use of only signals from satellites. Satellite based positioning can provide high accuracy, but require a positive line of sight between satellites and the wireless device. Further, receiving and processing satellite positioning signals may consume substantial energy and hence shorten battery duration.

A device can communicate wirelessly with a wireless communication network by employing radio frequency (RF) field propagation. The radio frequency, a frequency within the electromagnetic spectrum associated with radio wave propagation, is supplied to an antenna that creates an electromagnetic field that propagates through space. A component of a wireless communication network can be a wireless station, for example, a cellular base station of a cellular network, or an access point of a wireless local area network (LAN) or a wireless personal area network (PAN). The wireless station can allow a wireless device to communicate with a wired network through an access gateway. Typically, the wireless station broadcasts a beacon signal providing key information necessary for wireless devices to connect to it. A wireless station can serve wireless devices located in a geographic area. When a wireless device functions as a cellular transceiver and/or a wireless transceiver, the wireless device can determine its position using the locations of the wireless stations to which the wireless device can communicate, by triangulating its position based on the strength of the signals received from the wireless stations, if the locations of the wireless stations are known.

As an alternative to triangulation based positioning, database based positioning can be used to determine a position of a wireless device by evaluation of the RF measurements. These measurements are compared to the entries of the database. The corresponding calculations find the best matching database entry and thus lead to a position estimate. Database based positioning can provide high degree of accuracy and is utilized for network-based positioning system. This method does not rely on line of sight conditions but benefits from the more distinct radio patterns of multipath environments. Only network inherent parameters are utilized so that no hardware modifications are required and legacy devices can be employed.

SUMMARY

Aspects of the disclosure provide a method. The method includes initiating clustering boundaries for the group of positioning data associated with a wireless station into a plurality of subsets. The boundaries are fixed boundaries that divide the space of received signal strength values. Then, the method includes extracting data from the group of positioning data stored in the database according to clustering boundaries of the subset stored in the wireless station information table. In an example, the method repeats the extracting step until a reset condition is satisfied. Further, the method includes calculating a cumulative distribution function value for the subset. In an example, the method repeats the extracting and calculating steps until an exit condition is satisfied. Further, the method includes determining clustering boundaries of the subset based on resetting cumulative distribution function value of the subset equal to the threshold value, and storing the determined clustering boundaries in an entry for the group in the wireless station information table.

In an embodiment, the reset condition is satisfied when the standard deviation of received signal strength values in the subset of positioning data reaches over a threshold value. In another embodiment, the reset condition is satisfied when the number of positioning data in the subset reaches over a threshold number. In another embodiment, the reset condition is satisfied when the standard error of sample mean for received signal strength values in the subset of positioning data reaches over a threshold value.

Further, in an embodiment, the exit condition is satisfied when the calculated cumulative distribution function value of the subset is over the threshold value.

Aspects of the disclosure provide another method. The method includes extracting the data from the group of positioning data stored in the database according to clustering boundaries of the next neighbor subset stored in the wireless station information table, calculating a cumulative distribution function value for the next neighbor subset, identifying clustering boundaries of the next neighbor subset be feasible when a feasible condition is satisfied, extracting the data from the group of positioning data stored in the database according to updated clustering boundaries of the neighbor subset stored in the wireless station information table, calculating a cumulative distribution function value for the neighbor subset, identifying clustering boundaries of the neighbor subset be feasible when an existence condition is satisfied, determining clustering boundaries for the residual subsets based on resetting cumulative distribution function value, and storing the determined clustering boundaries in an entry for the group in the wireless station information table.

In an embodiment, the feasible condition is satisfied when the calculated cumulative distribution function value of the next neighbor subset is between the threshold value and the sum of threshold and tolerance values. In another embodiment, the existence condition is satisfied when the calculated cumulative distribution function value of the neighbor subset is between the two boundary values in the following in equation:

$$1-2\text{CDF}_T-A-\text{CDF}_{p,sum} \leq \text{CDF}_n \leq 1-2\text{CDF}_T-\text{CDF}_{p,sum} \quad (5)$$

where A denotes a tolerance value and is a small real number, $\text{CDF}_T$ denotes the threshold value of CDF, the $\text{CDF}_n$ denotes the calculated CDF value of the neighbor subset, and the $\text{CDF}_{p,sum}$ denotes a partial sum of CDF values for all the subsets in the group except the present subset, the neighbor subset and the next neighbor subset.

In an embodiment, to determine clustering boundaries for the residual subsets based on resetting the cumulative distribution function value, the cumulative distribution function value can be calculated using the following equation:

$$CDF = \frac{1-D}{B},$$

where D is the sum of the CDF values of the present subset, the neighbor subset, and the next neighbor subset; and B is the number of the rest of the subsets.

In an embodiment, the cumulative distribution function value is equal to the threshold value when the feasible condition or the existence condition cannot be satisfied.

Aspects of the disclosure provide a system including a cluster allocation module. The cluster allocation module is configured to perform initiate clustering boundaries for the group of positioning data associated with a wireless station into a plurality of subsets. The boundaries are fixed boundaries that divide the space of received signal strength values. The cluster allocation module is configured to extract data from the group of positioning data stored in the database according to clustering boundaries of the subset stored in the wireless station information table. Further, the cluster allocation module is configured to repeat the extraction operation until a reset condition is satisfied. Further, the cluster allocation module is configured to calculate a cumulative distribution function value for the subset. In an embodiment, the cluster allocation module is configured to repeat the extraction and calculation operations until an exit condition is satisfied. Then, the cluster allocation module is configured to determine clustering boundaries of the subset based on resetting cumulative distribution function value of the subset equal to the threshold value, and store the determined clustering boundaries in an entry for the group in the wireless station information table.

In another embodiment, the cluster allocation module is configured to extract the data from the group of positioning data stored in the database according to clustering boundaries of the next neighbor subset stored in the wireless station information table, calculate a cumulative distribution function value for the next neighbor subset, identify clustering boundaries of the next neighbor subset be feasible when a feasible condition is satisfied, extract the data from the group of positioning data stored in the database according to updated clustering boundaries of the neighbor subset stored in the wireless station information table, calculate a cumulative distribution function value for the neighbor subset, identify clustering boundaries of the neighbor subset be feasible when an existence condition is satisfied, determine clustering boundaries for the residual subsets based on resetting cumulative distribution function value, and store the determined clustering boundaries in an entry for the group in the wireless station information table.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
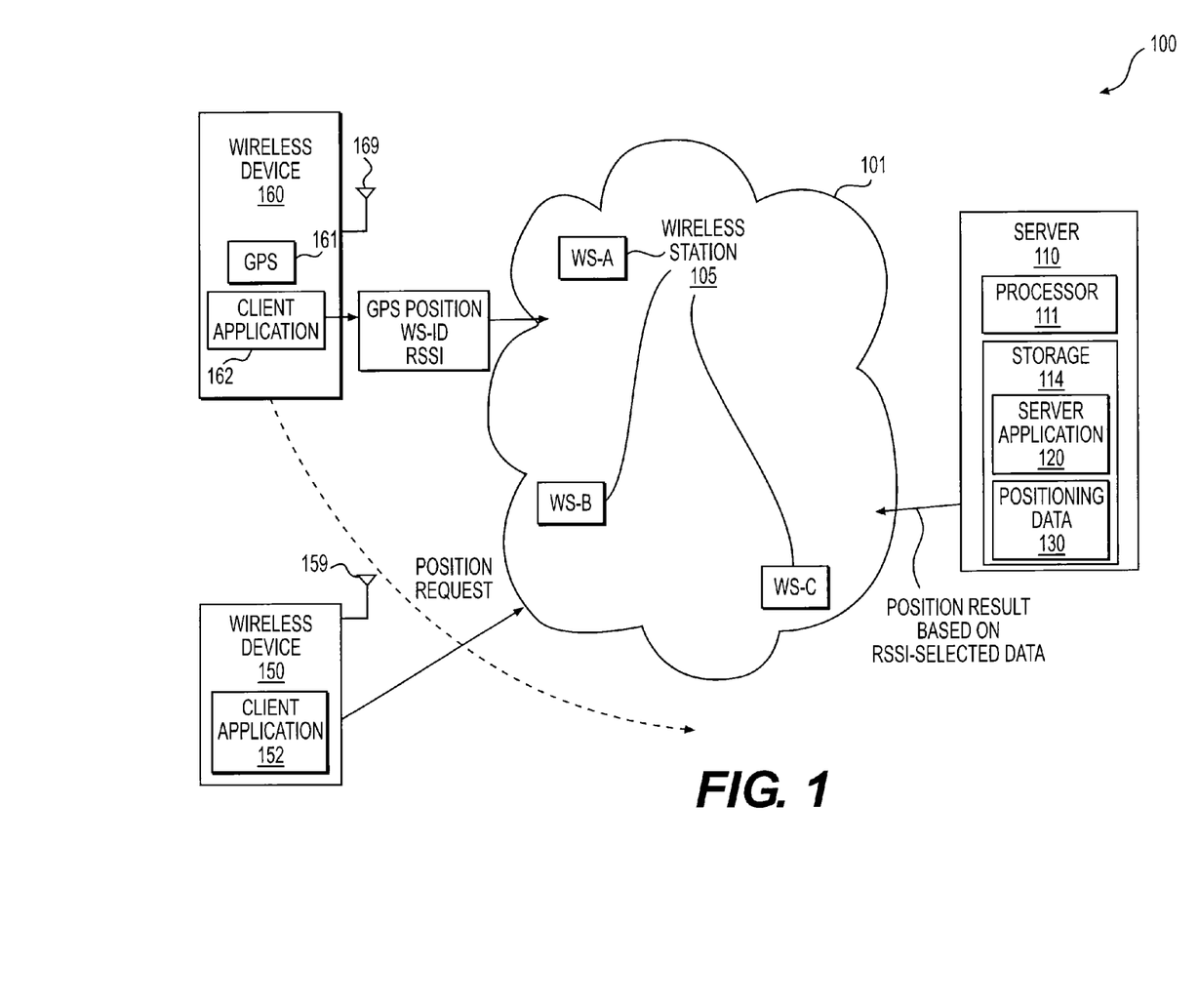
FIG. 1 shows a diagram of a positioning system example 100 according to an embodiment of the disclosure.

FIG. 1 shows a diagram of a positioning system example 100 according to an embodiment of the disclosure. As illustrated, the system 100 includes a plurality of components, each of which acts to provide specific functionality. These components include software which is stored in a storage and then executed on a processor to provide the functionality, hardware which is adapted to provide the component's functionality, or a combination of software and hardware which work together to provide the component's functionality.

The system 100 includes a network 101, a positioning server 110, and a plurality of wireless devices, such as wireless devices 150 and 160. The network 101 includes a plurality of wireless stations 105, such as wireless stations WS-A to WS-C, configured to communicate with the wireless devices via wireless signals. The positioning server 110 stores a database of previously obtained positioning data. Each positioning data associates position information of a location with fingerprints of wireless communication at the location. In an example, the fingerprints of wireless communication include an identifier of a wireless station that covers wireless communication at the location and a characteristic of a wireless signal received at the location. The positioning data in the database is managed into groups associated with wireless stations. Further, a group of positioning data associated with a wireless station is clustered into subsets.

According to an aspect of the disclosure, the positioning server 110 is configured to determine boundaries that are used to cluster the positioning data of a group into subsets. Further, the positioning server 110 is configured to select one of the subsets in response to a positioning request from a wireless device, and determine the position of the wireless device based on the selected subset. In an embodiment, the boundaries are determined to improve the accuracy of the position determination. In an example, the positioning server 110 is configured to determine boundary values to populate the positioning data uniformly into the subsets.

In the FIG. 1 example, the network 101 includes a single network or a plurality of networks of the same or different types. In an example, the network 101 includes a fiber optic network in connection with a cellular network. Further, the network 101 can be a data network or a telecommunications or video distribution (e.g. cable, terrestrial broadcast, or satellite) network in connection with a data network. Any combination of telecommunications, video/audio distribution and data networks, whether a global, national, regional, wide-area, local area, or in-home network, can be used without departing from the spirit and scope of the disclosure.

According to an embodiment of the disclosure, the wireless stations 105 can be cellular base stations in a cellular network. Each wireless station 105 is configured according to various cellular technologies, such as global system for mobile (GSM), code division multiple access (CDMA), wideband code division multiple access (WCDMA), long term evolution (LTE) and the like to use radio frequency signals to communicate with the wireless devices. The cellular base station of a cellular network can broadcast a beacon signal providing an identifier (e.g., cell global identifier) for a plurality of wireless devices to connect to it when the wireless devices are within a communication range of the cellular base station. In turn, a plurality of cellular base stations may be available to a wireless device. As shown in FIG. 1 example, wireless device 160 can be connected to cellular base station WS-A, and cellular base station WS-A can be a serving base station for the wireless device 160. The serving base station WS-A can provide the wireless device 160 with telephony services and/or can relay the transmission, by providing communication access to a wide area network (WAN), such as the Internet, by use of a gateway, to the positioning server 110. While the wireless device 160 is wireless-connected to the serving base station WS-A, the wireless device 160 may receive beacon signals from neighboring base stations WS-B and WS-C.

According to another embodiment of the disclosure, the wireless stations 105 can be access points in a wireless local area network (LAN) or a wireless personal area network (PAN). Each wireless station 105 is configured according to various communication protocols, such as an Institute of Electrical and Electronics Engineers (IEEE) 802.11 based protocol (e.g., WiFi™ network) or an IEEE 802.15 based protocol (e.g., Bluetooth™ network), to use radio frequency signals to communicate with the wireless devices. The access point can broadcast a beacon signal providing an identifier (e.g., medium access control (MAC) address) for a plurality of wireless devices to connect to it when wireless devices are within a communication range of the access point. In turn, a plurality of access points can be available to a wireless device for connection. Those identifiers need not be associated with access points to which wireless device is connected or can connect. All identifiers of the access points retrieved by wireless device can be used in the position estimate. As shown in FIG. 1 example, wireless device 160 is located within a communication range of assess point WS-A in addition to access points WS-B and WS-C. Wireless device 160 can identify access points WS-A to WS-C under the wireless communication protocol used in a WiFi™ network. Access points WS-A to WS-C can be identified by MAC addresses of the access points. Access point WS-A can relay the transmission, by providing communication access to a WAN, such as the Internet, to the positioning server 110.

According to another embodiment of the disclosure, the wireless stations 105 include a first plurality of cellular base stations in a cellular network, and a second plurality of access points in a wireless LAN. As shown in FIG. 1 example, the wireless device 160 can be wireless-connected to cellular base station WS-A, and the cellular base station WS-A can be the serving base station for the wireless device 160. The serving base station WS-A can provide the wireless device 160 with telephony services and/or network (e.g., Internet) access. While the wireless device 160 is connected to serving base station WS-A, wireless device may receive beacon signals from access points WS-B and WS-C.

The wireless devices can be any type of mobile devices, such as laptop computer, tablet computer, smart phone, wearable electronic device, and the like that are configured to communicate with the wireless stations 105 using wireless signals. A wireless device can include hardware including, but not limited to, a processor and memory for executing and storing instructions, software including one or more applications and an operating system. The wireless device may have multiple processors and multiple shared or separate memory components. In an example, a wireless device is portable by a person. In another example, a wireless device is installable on a vehicle.

The positioning server 110 includes a plurality of components for database management and position determination. As shown in FIG. 1 example, the positioning server 110 includes a processor 111 and a storage medium 114. In an example, the positioning server 110 can include more than one processors and storage media. In an example, the positioning server 110 is implemented using a distributed system that includes multiple processors, and/or multiple storage media coupled together by a network. The storage medium 114 stores positioning data 130. The positioning data can associate locations with wireless fingerprints, such as identifiers of the wireless stations 105 and wireless signal characteristics. In addition, the storage medium 114 stores various software instructions, such as a server application for database management and position determination. In an example, the processor 111 executes the server application to provide database management and positioning service.

According to an aspect of the disclosure, the wireless devices are installed with a client application for positioning. In an example, a wireless device with the client application installed provides positioning data to the positioning server 110. In another example, a wireless device with the client application requests positioning service from the positioning server 110.

In the FIG. 1 example, the wireless device 160 includes a plurality of components, such as an antenna 169, a receiving circuit (not shown), a transmitting circuit (not shown), a processor (not shown), and the like, to enable wireless communication with the wireless stations 105. In addition, the wireless device 160 is installed with a satellite positioning system, such as a global positioning system (GPS) 161, and a client application 162. In an example, the GPS 161 includes a receiver (not shown) to receive signals from four or more satellites. The signals include transmission timing information and satellite location information. Based on the received signals, the GPS 161 calculates distances to the satellites. Then, the distances to the satellites and the satellite location information are used to determine the location of the wireless device 160. Position information of the location relates generally to geographic coordinates that include a latitude coordinate, a longitude coordinate, and an altitude coordinate of wireless device 160. In an example, position information of the location is represented as a pair of a latitude coordinate and a longitude coordinate.

The client application 162 enables the wireless device 160 to communicate with the positioning server 110. In an embodiment, a user of the wireless device 160 turns on the GPS 161 to allow the wireless device 160 to provide direction information on a trip. When the GPS 161 is turned on, the client application 162 requests a permission by the user, for example via a user interface, to provide positioning data to the positioning server 110.

When the user permits the request via the user interface, the client application 162 provides information to form positioning data in the positioning server 110. In an example, at a location, the client application 162 obtains position information (e.g., latitude and longitude) from the GPS 161. Further, the client application 162 obtains fingerprints of wireless communication at the location, such as identifiers of wireless stations 105 that are in wireless communication with the wireless device 160 and characteristics of wireless signals at the location. In an example, the client application 162 obtains a received signal strength indicator (RSSI) as characteristic of a wireless signal received at the location. Further, the client application 162 prepares a message to the positioning server 110 according to a network communication protocol (e.g., software for implementing communication protocol, such as the Transmission Control Protocol/Internet Protocol (TCP/IP), Hypertext Transfer Protocol (HTTP), etc.). The message carries information to form a positioning data, such as the position information, an identifier of a wireless station and a characteristic of a wireless signal received at the location from the wireless station. Then, the wireless device 160 sends a wireless signal corresponding to the message to the wireless station and the wireless station forwards the message to the positioning server 110 via the network 101. When the user with the wireless device 160 moves on the trip, at different locations, the wireless device 160 have different wireless fingerprints, such as in communication with different wireless stations, having different values of RSSI, and the like. The wireless device 160 can provide position information associated with wireless fingerprints at the different locations on the trip to the positioning server 110. In an example, when the positioning server 110 receives a message carrying information to form a positioning data, the positioning server 110 retrieves from the message the position information and the associated wireless fingerprints, such as an identifier of a wireless station and a value of RSSI, and forms a positioning data that can associate position information with wireless fingerprints. Further, the positioning server 110 stores the formed positioning data in the storage medium 114.

According to an aspect of the disclosure, various wireless devices are similarly configured as the wireless device 160 to send messages carrying information to form positioning data from different locations. The positioning server 110 receives the messages, form positioning data and stores the positioning data in the storage medium 114. In an example, the positioning data are stored in a positioning database.

Further, according to the aspect of the disclosure, the positioning server 110 manages the positioning database, then based on the positioning database, the positioning server 110 provides positioning service to another wireless device, such as the wireless device 150. In the FIG. 1 example, the wireless device 150 includes a plurality of components, such as an antenna 159, a receiving circuit (not shown), a transmitting circuit (not shown), a processor (not shown), and the like, to enable wireless communication with the wireless stations 105. In addition, the wireless device 150 is installed with a client application 152 for positioning. In an example, the wireless device 150 does not have a GPS, but has a need of knowing its position.

In an example, at a position when a user of the wireless device 150 wants to know the position, the user instructs the client application 152 via a user interface. Then, the client application 152 causes the wireless device 150 to send a message according to a network communication protocol to the positioning server 110. The message carries a position request. The wireless device 150 can provide wireless fingerprints, such as an identifier of a wireless station in communication with the wireless device 150, a value of RSSI for a wireless signal received at the location, and the like, to the positioning server 110 in the same message or in a different message. In an embodiment, when the positioning server 110 receives the position request from the wireless device 150, the positioning server 110 identifies the wireless station that is in communication with the wireless device 150. The positioning server 110 retrieves a group of positioning data associated with the wireless station. Further, the positioning server 110 selects a subset in the group of the positioning data for the wireless station that has similar signal characteristic (e.g., RSSI value in a same range) as the wireless device 150 at its location. Then, the positioning server 110 determines a position of the wireless device 150 based on the selected subset in the group of positioning data. In an example, the position information is represented as a pair of a latitude coordinate and a longitude coordinate. The positioning server 110 calculates an average, or a weighted average of locations as a position result from the subset in the group of positioning data. In the example, the positioning server 110 sends a response message carrying the position result to the wireless device 150 according to a network communication protocol.

According to an aspect of the disclosure, the positioning server 110 is configured to determine boundaries to cluster the positioning data of a group associated with a wireless station into subsets. In an embodiment, the positioning server 110 determines boundary values for signal characteristics, such as RSSI values and the like, to cluster the positioning data of the group.

In an example, initially, the positioning server 110 evenly divides a space of RSSI values. For example, the RSSI values are ranged from 0 to 100, and initially the positioning server 110 evenly divides the space of RSSI values into three subsets. Thus, the positioning data of the group is clustered into a first subset with RSSI values from 0 to 33, a second subset with RSSI values from 34 to 66, and a third subset with RSSI values from 67 to 100. In another example, a maximum RSSI in the group is 90, and a minimum RSSI in the group is 10, and initially the positioning server 110 evenly divides the space of RSSI values from the minimum RSSI to the maximum RSSI into four subsets. For example, the positioning data of the group is clustered into a first subset with RSSI values from 10 to 30, a second subset with RSSI values from 31 to 50, a third subset with RSSI values from 51 to 70, and a fourth subset with RSSI values from 71 to 90.

Further, according to an aspect of the disclosure, the positioning server 110 is configured to change the boundary values to re-cluster the positioning data of the group into new subsets in order to provide more accurate position determination service. In an embodiment, the positioning server 110 is configured to dynamically change the boundary values for the new subsets to uniformly populate the positioning data in the subsets. In an example, when one or more new positioning data is received, the positioning server 110 determines whether the boundary values need to be updated. For example, the positioning server 110 calculates a statistical parameter that is indicative of the population uniformity, such as a cumulative distribution function (CDF), for one or more subsets. Then, the positioning server 110 compares the statistical parameter to a threshold, and determines whether to update the boundaries based on the comparison. Further, in an example, to update the boundaries for a subset, the positioning server 110 determines the CDF value for the subset, and determines the boundaries according to the determined CDF. Further details of cluster allocation processes will be described below with reference to FIGS. 4 through 5.

Figure 2:
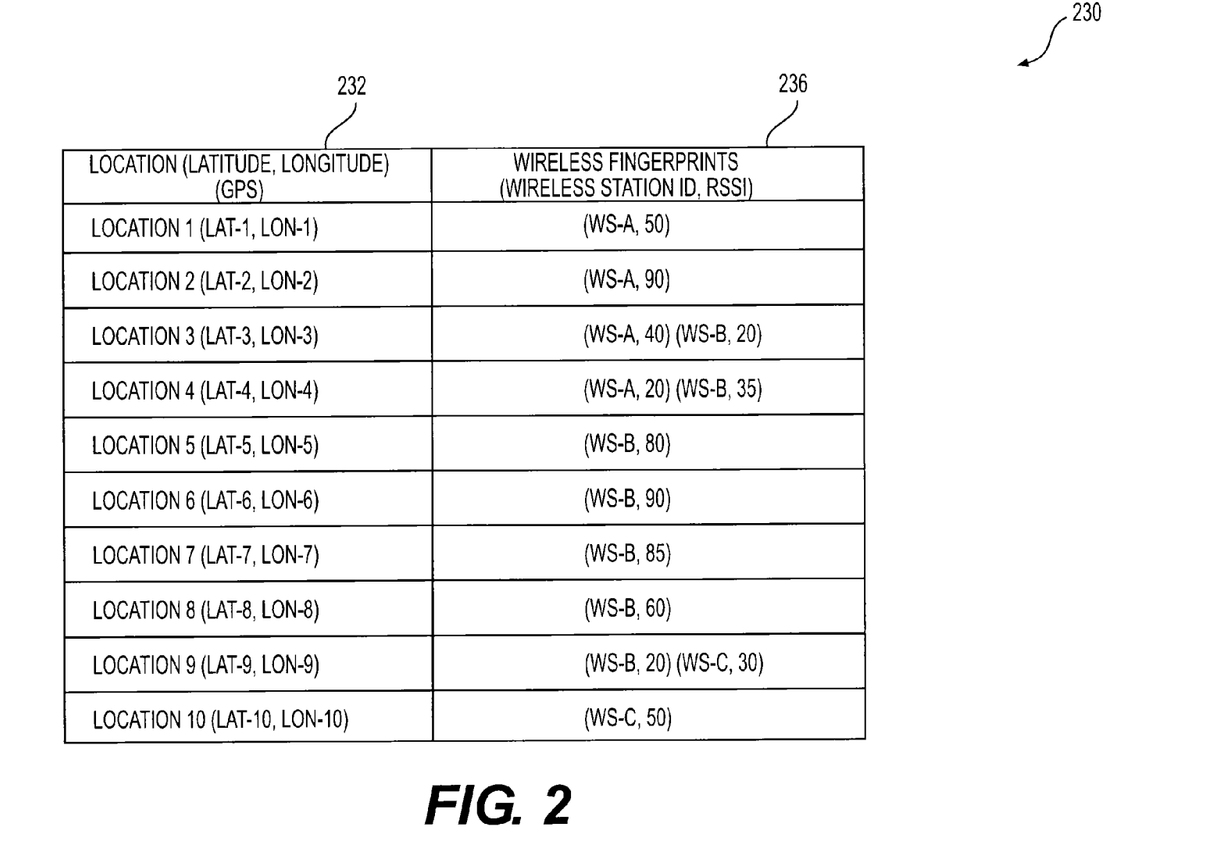
FIG. 2 shows an example for positioning data according to an embodiment of the disclosure.

FIG. 2 shows an example for positioning data according to an embodiment of the disclosure. The positioning data are stored in the format of a table 230. The table 230 includes a first field 232 for location and a second field 236 for wireless fingerprints. In the FIG. 2 example, the location is represented as a pair of a latitude coordinate and a longitude coordinate, and the wireless fingerprints are represented as an identifier of a wireless station and a RSSI value received from the wireless station at the location.

For example, at a first location (LOCATION 1), a wireless device can receive a wireless signal from the wireless station WS-A. Then, in a positioning data, the first field stores latitude (LAT-1) and longitude (LON-1) for the first location, and the second field stores the fingerprints of a wireless signal that includes an identifier of the wireless station WS-A and a RSSI value (e.g., 50) received from the wireless station WS-A at the first location. In an example, a wireless device may receive wireless signals from more than one wireless station. For example, at a third location (LOCATION 3), a wireless device can receive wireless signals from both the wireless station WS-A and the wireless station WS-B. Then, in a positioning data, the first field stores latitude (LAT-3) and longitude (LON-3) for the third location, and the second field stores the fingerprints of the wireless signals that includes the identifier of the wireless station WS-A in association with a RSSI value (e.g., 40) received from the wireless station WS-A at the third location, and the identifier of the wireless station WS-B in association with a RSSI value (e.g., 20) received from the wireless station WS-B at the third location.

In an embodiment of the disclosure, the positioning data can be stored in a database of any suitable format. In an example, the positioning data are stored in a format to facilitate extracting a group of position data associated with a wireless station and to facilitate extracting a subset of position data from the group that has a specific signal characteristic. In an example, each group of positioning data associated with a wireless station is clustered into subsets according to clustering boundaries stored in a wireless station information table.

In an example, the positioning server 110 includes a first wireless station information table for a cellular network. The first wireless station information table includes a plurality of fields, such as 23 fields and the like, to store clustering information. Each entry in the first wireless station information table corresponds to clustering information for a group of positioning data associated with a cellular base station in the cellular network. In an example, the group of positioning data is clustered into three subsets according to RSSI values. The 23 fields are (1) an identification of the cellular technology type (Id), (2) mobile country code (MCC), (3) mobile network code (MNC), (4) local area code (LAC), (5) cell identifier (Ci), (6) latitude of the cellular base station (Lat), (7) longitude of the cellular base station (Lon), (8) uncertainty errors for the group of positioning data (Uncert Error), (9) the total number of data in the group of positioning data (Data Num), (10) uncertainty errors for the first subset of positioning data (Uncert1), (11) the number of data in the first subset of positioning data (Data Num1), (12) uncertainty errors for the second subset of positioning data (Uncert2), (13) the number of data in the second subset of positioning data (Data Num2) (14) uncertainty errors for the third subset of positioning data (Uncert3), (15) the number of data in the third subset of positioning data (Data Num3), (16) coverage range (Cover Range), (17) RSSI threshold (RSSI Thrshld), (18) a first RSSI boundary value (RSS1), (19) a second RSSI boundary value (RSS2), (20) a third RSSI boundary value (RSS3), (21) a fourth RSSI boundary value (RSS4), (22) the most recent inquiry time (Inquiry Time) and (23) the most recent update time (Update Time).

According to an entry in the first wireless station information table, positioning data associated with a wireless station is clustered into three subsets. For example, from the positioning database, a group of positioning data associated with a wireless station identified by the fields (2)-(5) is extracted. The group of positioning data has RSSI values between the first RSSI boundary and the fourth RSSI boundary value. Then, the group of positioning data is clustered into a first subset, a second subset and a third subset according to the boundary values. For example, the first subset of positioning data for the group has RSSI values between the first RSSI boundary value and the second RSSI boundary value; the second subset of positioning data for the group has RSSI values between the second RSSI boundary value and the third RSSI boundary value; the third subset of positioning data for the group has RSSI values between the third RSSI boundary value and the fourth RSSI boundary value.

In another example, the positioning server 110 includes a second wireless station information table for a wireless LAN. The second wireless station information table includes a plurality of fields, such as 18 fields and the like, for each entry to store clustering information. Each entry in the second wireless station information table corresponds to clustering information for a group of positioning data associated with an access point in the wireless LAN. In an example, the group of positioning data is clustered into two subsets according to RSSI values. The 18 fields are (1) an identification of wireless LAN type (Id), (2) mobile country code (MCC), (3) media access control address (MAC), (4) latitude of the access point (Lat), (5) longitude of the access point (Lon), (6) uncertainty errors for the group of positioning data (Uncert Error), (7) the total number of data in the group of positioning data (Data Num), (8) uncertainty errors for the first subset of positioning data (Uncert1), (9) the number of data in the first subset of positioning data (Data Num1), (10) uncertainty errors for the second subset of positioning data (Uncert2), (11) the number of data in the second subset of positioning data (Data Num2), (12) coverage range (Cover Range), (13) RSSI threshold (RSSI Thrshld), (14) a first RSSI boundary value (RSS1), (15) a second RSSI boundary value (RSS2), (16) a third RSSI boundary value (RSS3), (17) the most recent inquiry time (Inquiry Time) and (18) the most recent update time (Update Time).

According to an entry in the second wireless station information table, positioning data associated with an access point is clustered into two subsets. For example, from the positioning database, a group of positioning data associated with an access point identified by the fields (2)-(3) is extracted. The group of positioning data has RSSI values between the first RSSI boundary and the third RSSI boundary value. Then, the group of positioning data is clustered into a first subset and a second subset according to the boundary values. For example, the first subset of positioning data for the group has RSSI values between the first RSSI boundary value and the second RSSI boundary value; and the second subset of positioning data for the group has RSSI values between the second RSSI boundary value and the third RSSI boundary value.

According to an aspect of the disclosure, the database of positioning data is updated frequently, such as in real-time, or at a particular time, or during a particular time period, or daily. The population distribution of the positioning data may vary. In an embodiment, a positioning server, such as the positioning server 110, is configured to dynamically adjust the clustering boundaries to maintain relatively uniform population across the subsets.

Figure 3:
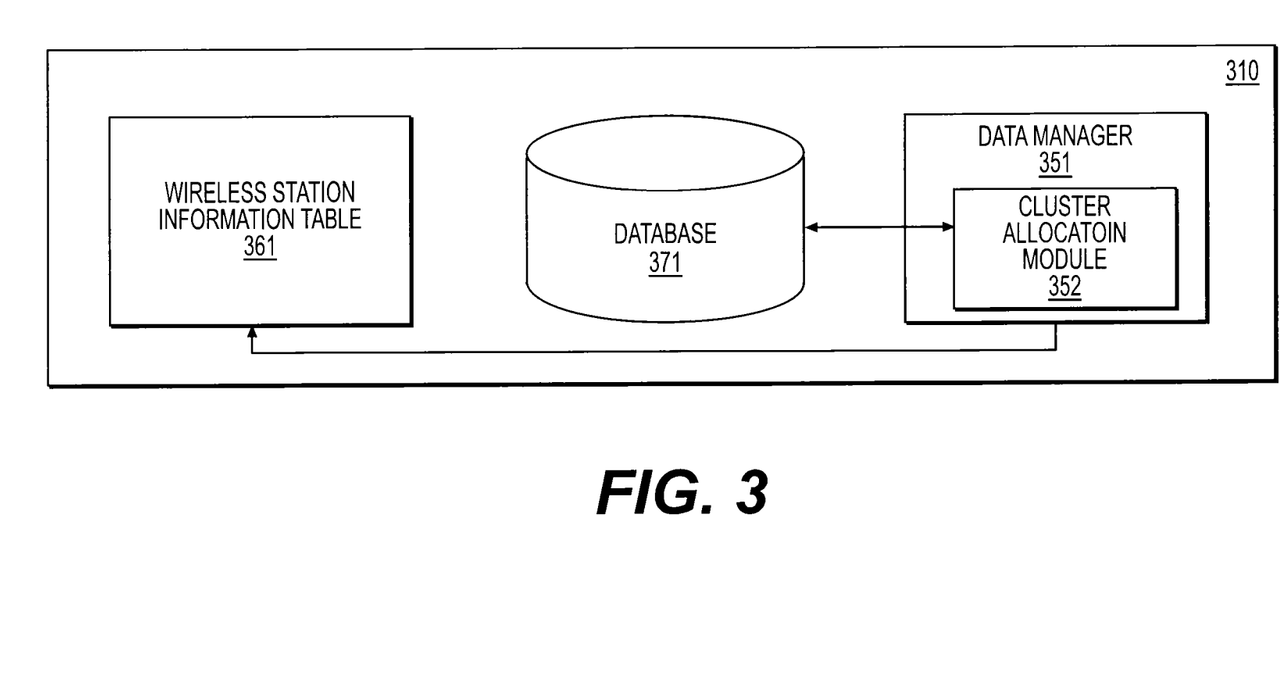
FIG. 3 shows a block diagram of a server example 310 according to an embodiment of the disclosure.

FIG. 3 shows a block diagram of a positioning server example 310 according to an embodiment of the disclosure. As illustrated, the positioning server 310 includes a plurality of elements, each of which acts to provide specific functionality. These elements include software which is stored in a memory and then executed on a processor to provide the functionality, hardware which is adapted to provide the element's functionality, or a combination of software and hardware which work together to provide the element's functionality.

The positioning server 310 is configured to dynamically adjust the clustering boundaries to perform cluster allocation. The positioning server 310 includes a database 371, a data manager 351, and a wireless station information table 361. These elements are coupled together as shown in FIG. 3. The positioning server 310 can include other suitable components (not shown), such as a data retriever, a data processor, a location estimator, and the like.

The database 371 stores previously obtained positioning data. In an example, each positioning data stores position information (e.g., latitude and longitude) for a location in association with wireless fingerprints (e.g., an identifier of a wireless station, and a RSSI value received from the wireless station) at the location. In an example, the database 371 is organized under a hierarchical folder structure, and the folders are mapped to directories in a file system.

The data manager 351 includes a cluster allocation module 352 that is configured to dynamically adjust clustering boundaries of subsets in each group. In an embodiment, the cluster allocation module 352 dynamically adjusts the clustering boundaries such that the subsets of the group have relatively equal population. In an example, the cluster allocation module 352 determines a value of a cumulative distribution function (CDF) for each subset. The CDF is calculated based on the population distribution in each subset. When the CDF values for the subsets are in a range, the subsets are configured to possibly have relatively uniform population across the subsets, and when a CDF value for a subset is out of the range, the cluster allocation module 352 uses suitable algorithms to determine the RSSI boundary values to re-define the subsets in order to achieve relatively uniform population across the subsets for the group. The updated RSSI boundary values for the group is then stored in the wireless station information table 361.

In the wireless station information table, each entry corresponds to clustering information for a group of positioning data associated with a wireless station (e.g., a cellular base station or an access point). The group of positioning data for a wireless station can be clustered into a plurality of subsets according to clustering boundaries stored in the wireless station information table 361. Further details of cluster allocation processes will be described below with reference to FIGS. 4 and 5. In an example, the wireless station information table 361 includes a first wireless station information table that is for a cellular network. Further, the wireless station information table 361 includes a second wireless station information table that is for a wireless LAN.

According to an aspect of the disclosure, each positioning data associates position information of a location with an identifier of a wireless station for providing wireless connection at the location and the strength of a wireless signal received at the location. In an example, when the signal strength is measured at a plurality of locations over the area to be covered, values of the measured signal strength follow Gaussian distribution.

According to an aspect of the disclosure, the group of positioning data associated with a wireless station is clustered into subsets according to signal characteristics, such as RSSI values. Each subset is defined by cluster boundaries. In an example, the clustering boundaries include an upper clustering boundary and a lower clustering boundary. The probability of a subset can be expressed in terms of CDF. In an example, the CDF is calculated using Eq. 1:

$$CDF = P\left(\frac{S_U - \bar{S}}{\sigma_S} < Y \leq \frac{S_L - \bar{S}}{\sigma_S}\right) = \Phi\left(\frac{S_U - \bar{S}}{\sigma_S}\right) - \Phi\left(\frac{S_L - \bar{S}}{\sigma_S}\right) \quad \text{Eq. 1}$$

where $S_U$ denotes the upper clustering boundary for the subset; $S_L$ denotes the lower clustering boundary for the subset; $\bar{S}$ denotes the mean of RSSI values in the group of positioning data; $\sigma_S$ denotes the standard deviation of RSSI values in the group of positioning data; and P denotes probability. In an example, $\Phi$ is calculated using Eq. 2 assuming Gaussian distribution:

$$\Phi(x) = \frac{1}{\sqrt{2\pi}} \int_{-\infty}^{x} e^{\frac{t^2}{2}} dt \quad \text{Eq. 2}$$

In an embodiment, when the CDF value of the subset is much larger than a threshold value, it implies that clustering boundaries of the subset are possibly unfeasible to achieve the positioning data to have uniform population across subsets for the group. In an example, the threshold value can be formulated using Eq. 3:

$$CDF_T = \frac{1}{K} \quad \text{Eq. 3}$$

where K is the number of subsets. In an example, K is a real number and can be configurable to fine tune a balance between certainty (e.g., a larger interval of the subset can result in more confidence when determining position information of the wireless device using the subset of positioning data) and precision (e.g., a smaller interval of the subset can result in more accurate position of the wireless device when determining position information of the wireless device using the subset of positioning data).

During operation, in an example, when wireless devices, such as the wireless device 160 in the FIG. 1 example, send messages carrying information to form positioning data from different locations, the positioning server 310 receives the messages, forms positioning data and stores the positioning data in the storage medium. In an example, the positioning server 310 includes a data retriever (not shown). The data receiver is configured to receive messages carrying information, and to sort the information according to the wireless station information table. For example, the data receiver detects a wireless station, and selects an entry in a wireless station information table that identifies the wireless station (e.g., the MCC, the MNC, the LAC, and the Ci in the field (2) to (5) of the selected entry in the first wireless station information table match the identifiers of the wireless station). Then, from the information, the data receiver forms positioning data in a group associated with the wireless station based on time periods. It is noted that when none of the entries in the wireless station information table identifies the detected wireless station, a new entry can be generated.

Further, in an example, positioning server 310 includes a data processor (not shown). The data processor is configured to analyze the positioning data, to exclude one or more outliers from the positioning data, and to combine the current positioning data with the historical positioning data in the database 371. In addition, in an example, the positioning server 310 includes a location estimator (not shown). The location estimator is configured to determine an estimated location of a wireless station (e.g., latitude and longitude of the cellular base station in the field (6) and (7) of the entry in the first wireless station information table), to calculate uncertainty values (e.g., uncertainty errors in the field (8), (10), (12), (14) of the entry in the first wireless station information table), and to calculate coverage area length and transmission signal range (e.g., the coverage range and RSSI threshold in the field (16) and (17) of the entry in the first wireless station information table). The positioning data are stored in the database 371.

In an embodiment, when none of the entries in the wireless station information table identifies the detected wireless station, a new entry associated with the wireless station can be generated. In an example, the positioning server 310 initiates clustering boundaries for the new entry, and the group of positioning data associated with the wireless station can be clustered into subsets according to the initiated clustering boundaries. In an example, a maximum RSSI value in the group of positioning data is used to define an upper clustering boundary ($S_1$) for the group, and a minimum RSSI value in the group of positioning data is used to define a lower clustering boundary ($S_2$) for the group.

Further, the positioning server 310 determines the initial boundaries between the upper clustering boundary and the lower clustering boundary to evenly divide the space of the group of positioning data into K subsets (K is a positive number). The initial boundaries can be represented as $[S_1, S_1-S', S_1-2S', \ldots, S_1-(K-1)S', S_2]$, where $S'=(S_1-S_2)/K$ is an interval between two adjacency boundaries. The clustering boundaries of the subsets are stored into the entry associated with the wireless station in the wireless station information table.

In the example, the first subset of positioning data for the group has RSSI values between $S_1$ and $S_1-S'$, where $S_1$ is the upper clustering boundary for the first subset and $S_1-S'$ is the lower clustering boundary for the first subset. The $K^{th}$ subset of positioning data for the group has RSSI values between $S_1-(K-1)S'$ and $S_2$, where $S_1-(K-1)S'$ is the upper clustering boundary for the $K^{th}$ subset and $S_2$ is the lower clustering boundary for the $K^{th}$ subset.

Further, in an embodiment, when the positioning server 310 receives more positioning data associated with the wireless station, the positioning server 310 evaluates population uniformity across the subsets, and updates the clustering boundaries to re-allocate the positioning data in order to achieve relatively uniform population across the subsets.

It is noted that the cluster allocation module 352 can use any suitable algorithm to re-cluster a group of positioning data into subsets of relatively equal population. In an embodiment, the cluster allocation module 352 assigns equal CDF values to all of the subsets in the group, and then determines the clustering boundaries of the subsets to achieve the equal CDF values. In another embodiment, the cluster allocation module 352 reassigns CDF values to a subset and one or more neighbor subsets, such as described in FIGS. 4 and 5.

Figure 4:
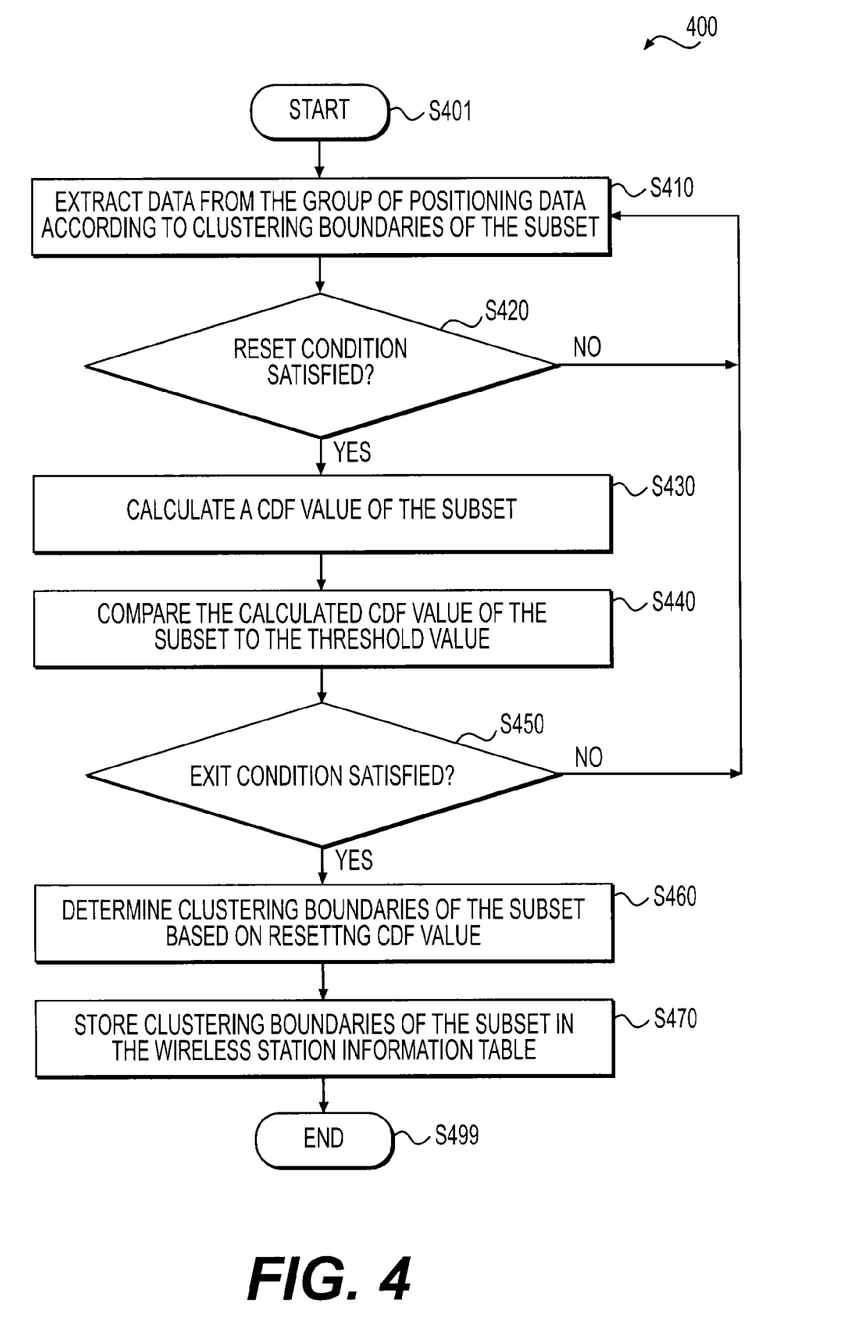
FIG. 4 shows a flow chart outlining a process example 400 according to an embodiment of the disclosure.

FIG. 4 shows a flowchart outlining a process example 400 for resetting clustering boundaries of the subsets according to an embodiment of the disclosure. In an example, the process is executed by the cluster allocation module 352 in the positioning server 310. The process starts at S401 and proceeds to S410.

At S410, the cluster allocation module 352 extracts positioning data of a subset from a group of positioning data stored in the database 371 according to clustering boundaries of the subset stored in a wireless station information table.

At S420, the cluster allocation module 352 determines whether a reset condition is satisfied for the subset. In an example, the reset condition is satisfied when a standard deviation of RSSI values in the subset of positioning data reaches over a threshold value. The threshold value is related to the RSSI distribution in the subset of positioning data. In an embodiment, a low standard deviation indicates that the RSSI values are very close to the population mean, which also indicates that the space for the subset is small and the RSSI values are concentrated in the space of the subset. When the RSSI values are concentrated in the space of the subset, a limited number of positioning data exists inside the subset. A high standard deviation indicates that the RSSI values are spread out over a larger range of values, which also indicates that the space for the subset is large and the RSSI values are scattered in the space of the subset. When the RSSI values are scattered in the space of the subset, a large number of positioning data exist inside the subset.

In another example, the reset condition is satisfied when the number of positioning data in the subset reaches over a threshold number. The threshold number is related to population distribution in the subset of positioning data. In an embodiment, a larger space in the subset can result in more confidence.

In another example, the reset condition is satisfied when a standard error of sample mean for RSSI values in the subset of positioning data reaches over a threshold value. In an embodiment, the threshold value is related to RSSI distribution in the subset of positioning data when population of positioning data is distributed in a relatively small space.

In an embodiment, the reset condition is not satisfied when the RSSI distribution and/or the population distribution in the subset of positioning data are not large enough for a confident level. For example, when the CDF value is very small, such as about zero CDF value.

When the reset condition is satisfied, the process proceeds to S430; otherwise, the process returns to S410 to extract positioning data of another subset.

At S430, the cluster allocation module 352 calculates a CDF value of the subset. In an example, the cluster allocation module 352 calculates the CDF value of the subset according to Eq.1.

At S440, the cluster allocation module 352 compares the calculated CDF value of the subset to a threshold value. In an example, the threshold value is determined according to Eq. 3.

At S450, the cluster allocation module 352 determines whether an exit condition is satisfied. In an example, the exit condition is satisfied when the calculated CDF value of the subset is over a tolerance range above the threshold value. When the exit condition is satisfied, the process proceeds to S460 to reset one or more boundaries for the subset; otherwise, the process returns to S410 to extract positioning data for another subset.

At S460, the cluster allocation module 352 resets CDF value for the subset and determines clustering boundaries of the subset based on the CDF value. In an example, the subset is the first subset or the last subset among the subsets of the group, the cluster allocation module 352 determines a one-side clustering boundary for the subset. In an example, the cluster allocation module 352 resets the CDF value of the subset equal to the CDF threshold value and determine a one-side clustering boundary for the subset (e.g., lower clustering boundary for the first subset or upper clustering boundary for the last subset) according to Eq. 1.

In another example, when the subset is in the middle of all the subsets of the group, such as the second subset, the cluster allocation module 352 determines two-side clustering boundaries for the subset. In an embodiment, the cluster allocation module 352 identifies two neighbor subsets to the present subset, calculates CDF values for the two neighbor subsets, and selects one of the neighbor subsets to update the clustering boundary for the selected neighbor subset and the present subset. For example, when the CDF value of a first neighbor subset to the upper clustering boundary of the present subset is about the threshold value, and the CDF value of a second neighbor subset to the lower clustering boundary of the present subset is lower than the threshold value, the cluster allocation module 352 selects the second neighbor subset, and determines the lower clustering boundary for the present subset.

At 470, the cluster allocation module 352 updates the entry for the group in the wireless station information table with the determined clustering boundary. It is noted that when a clustering boundary separating two adjacent subsets is updated, the populations of both subsets change. In an embodiment, the cluster allocation module 352 executes a process, such as a process described with reference to FIG. 5, to update other clustering boundary in order to have the CDF values for all the subsets to about the threshold value (e.g., in a tolerance range about the threshold value). When the CDF values for all the subsets are about threshold value, the process proceeds to 499 and terminates.

Figure 5:
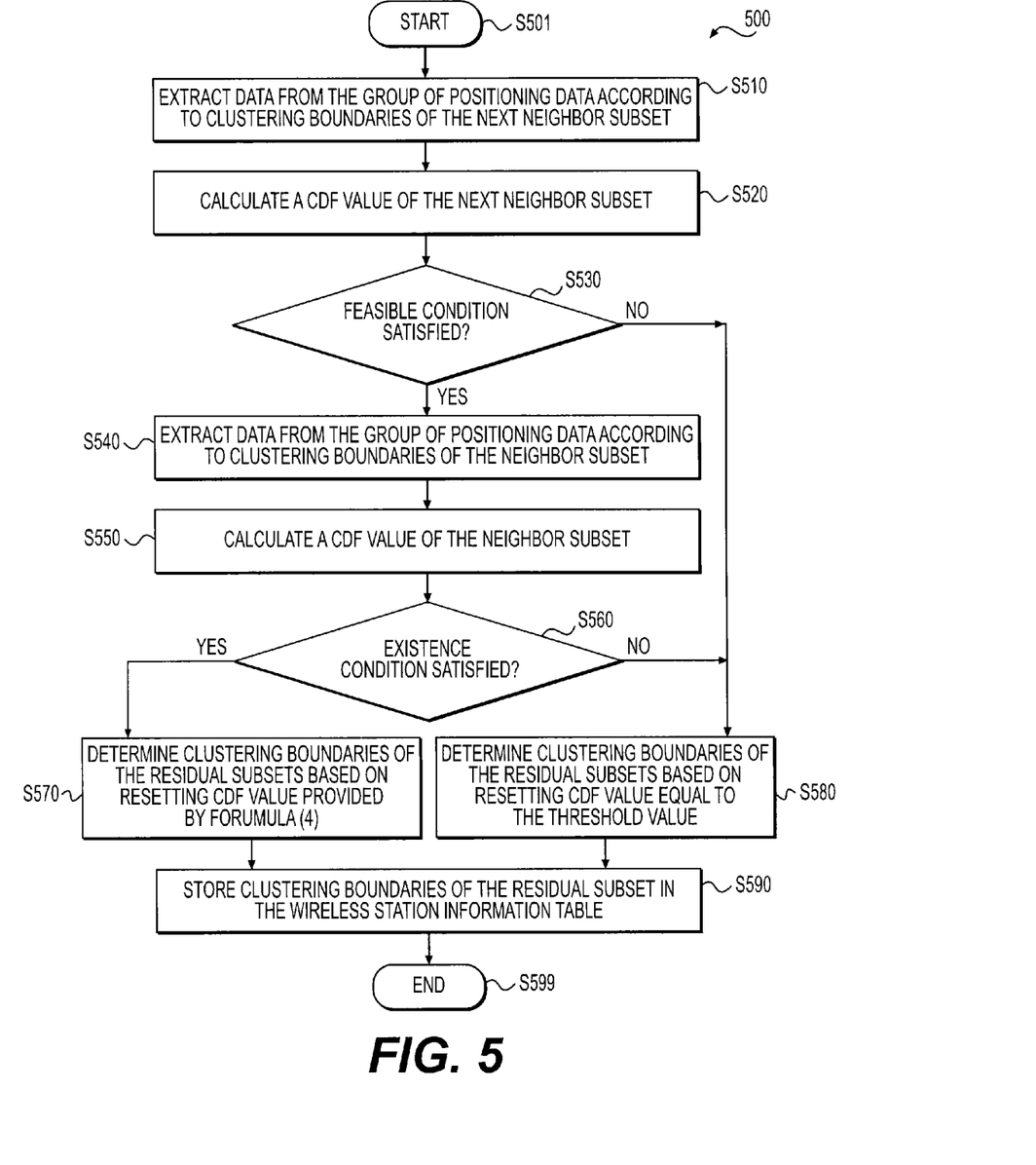
FIG. 5 shows a flow chart outlining a process example 500 according to an embodiment of the disclosure.

FIG. 5 shows a flowchart outlining a process example 500 for determining clustering boundaries of the subsets according to an embodiment of the disclosure. In an example, the process 500 is executed by the cluster allocation module 352 when a clustering boundary of the present subset in the entry of the wireless station information table has been updated at S470. The process starts at S501 and proceeds to S510.

At S510, the cluster allocation module 352 extracts the data from the group of positioning data stored in the database 371 according to clustering boundaries of a next neighbor subset stored in the wireless station information table. In an example, the cluster allocation module 352 has determines and updated a clustering boundary of the present subset (referred to as a first subset) to a neighbor subset (referred to as a second subset) in the entry of the wireless station information table. When the clustering boundary is changed, the change also affects the population of the neighbor subset that shares the clustering boundary with the present subset. The cluster allocation module 352 extracts the positioning data for a next neighbor subset (referred to as a third subset) according to the updated clustering boundaries. In the example, the first subset, the second subset and the third subset are three consecutive subsets.

At S520, the cluster allocation module 352 calculates the CDF value of the next neighbor subset (the third subset) according to Eq. 1.

At S530, the cluster allocation module 352 determines whether a feasible condition is satisfied. In an example, the cluster allocation module 352 determines whether the calculated CDF value of the next neighbor subset (third subset) is in a range. For example, the range is from the CDF threshold value to a sum of the CDF threshold value and a tolerance value. When the feasible condition is satisfied, the process proceeds to S540; otherwise, the process proceeds to S580.

At S540, the cluster allocation module 352 extracts positioning data of the neighbor subset (the second subset) from the group of positioning data stored in the database according to updated clustering boundaries stored in the wireless station information table.

At S550, the cluster allocation module 352 calculates a CDF value of the neighbor subset (the second subset) according to Eq. 1.

At S560, the cluster allocation module 352 determines whether an existence condition is satisfied. In an example, when the calculated CDF value of the neighbor subset (the second subset) satisfies the following in equation, the existence condition is satisfied:

$$1-2CDF_T-A-CDF_{p,sum} \leq CDF_n \leq 1-2CDF_T-CDF_{p,sum}$$

where A denotes a tolerance value and is a small real number, $CDF_T$ denotes the threshold value of CDF calculated according Eq. 3, the $CDF_n$ denotes the calculated CDF value of the neighbor subset (the second subset), and the $CDF_{p,SUM}$ denotes a partial sum of CDF values for all the subsets in the group except the first subset, the second subset and the third subset. In an example, the tolerance value is configurable, and is related to the number of total subsets in the group. When the existence condition is satisfied, the process proceeds to S570; otherwise, the process proceeds to S580.

At 570, the cluster allocation module 352 resets CDF values for the rest of the subsets, and determines clustering boundaries for the rest of the subsets based on reset CDF values. In an example, the CDF value are reset according to Eq. 4:

$$CDF = \frac{1-D}{B} \qquad \text{Eq. 4}$$

where D is the sum of the CDF values of the present subset (the first subset), the neighbor subset (the second subset), and the next neighbor subset (the third subset); and B is the number of the rest of the subsets. Then the cluster allocation module 352 determines the clustering boundaries of the subsets corresponding to the reset CDF values according to Eq. 1 for example.

At 580, the cluster allocation module 352 resets the CDF values for the rest of the subsets to the CDF threshold value, and then determines clustering boundaries of the subsets corresponding to the reset CDF values according to Eq. 1.

At 590, the cluster allocation module 352 stores the determined clustering boundaries in the entry of the wireless station information table for the group. The process proceeds to 599 and terminates.

In an example, when a plurality of positioning data is newly added in a group of positioning data in the database that is associated with a wireless station, and the maximum RSSI value and the minimum RSSI value for the group of positioning data do not change, the cluster allocation module 352 can perform the processes described in FIGS. 4 and 5 to determine the clustering boundaries of the group. However, in another example, the maximum RSSI value and/or the minimum RSSI value for the group of positioning data change after the addition of the plurality of positioning data, the cluster allocation module 352 can re-initiate clustering boundaries for the group, and then perform the processes described in FIGS. 4 and 5 to determine the clustering boundaries of the group.

The features as described in reference to FIGS. 1-5 can be implemented in one or more computer programs that are performed by a processing system, including at least one programmable processor coupled to received data and instructions from, and to transmit data and instructions, to a data storage system, at least one input device, and at least one output device. A computer program is sets of instructions that can be used, directly or indirectly, in a computer to perform a certain activity or bring about a certain result. A computer program can be written in any form of programming language (e.g., Java, Objective-C), including compiled or interpreted languages, and can be deployed in any form, including as a stand-alone program or as a module, component, a browser-based web application, or other unit suitable for use in a computing environment.

The features can be performed in a computer system that can include a back-end component (e.g., a data server), or that can include a middleware component (e.g., an application server), or that can include a front-end component (e.g., a computer having a graphical user interface or an Internet browser, or any combination of them). The components of the system can be connected by any form or medium of data communication networks. In some implementations, communication networks can include a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method, comprising:
   clustering entries of positioning data into subsets, each subset defined by a lower boundary of signal strength value and an upper boundary of signal strength value of a plurality of boundaries of signal strength values, each signal strength value indicating a strength of a signal received by a wireless device from a wireless station at a location; and
   checking a reset condition that is used to trigger a reset of the boundaries of signal strength values for clustering the entries of positioning data into the subsets, each entry of positioning data associating position information of a location with at least an identifier of a wireless station for providing wireless connection at the location and a signal strength received at the location.

2. The method of claim 1, further comprising:
   updating, when the reset condition is satisfied, one or more of the boundaries of signal strength values to re-allocate the entries of positioning data in the subsets in order to increase a population uniformity across the subsets;
   storing the updated boundaries of signal strength values;
   selecting a subset of positioning data when a signal strength of a wireless device is within the updated boundaries of signal strength values of the subset in response to a position request to determine position information of the wireless device; and
   determining the position information of the wireless device based on the selected subset of positioning data.

3. The method of claim 1, wherein checking the reset condition that is used to trigger the reset of the boundaries of signal strength values for clustering the entries of positioning data associated with the wireless station into the subsets further comprises at least one of:
   comparing a standard deviation of the signal strength values in a subset with a threshold;
   comparing a number of positioning data in a subset to a threshold; and
   comparing a standard error of sample mean of the signal strength values in a subset to a threshold.

4. The method of claim 1, further comprising:
   updating, when the reset condition is satisfied, one or more of the boundaries of signal strength values to re-allocate the entries of positioning data in the subsets in order to increase a population uniformity across the subsets;
   determining a new cumulative distribution function (CDF) value for a subset; and
   determining one or two boundaries for the subset to achieve the new CDF.

5. The method of claim 4, wherein determining the new CDF value for the subset further comprises:
   determining the new CDF value for the subset based on CDF values of other subsets and a tolerance.

6. The method of claim 1, further comprising:
   updating, when the reset condition is satisfied, one or more of the boundaries of signal strength values to re-allocate the entries of positioning data in the subsets in order to increase a population uniformity across the subsets;
   assigning cumulative distribution function (CDF) values for the subsets; and
   determining the boundaries for the subsets to achieve the CDF values across the subsets.

7. The method of claim 6, wherein assigning the CDF values for the subsets further comprises:
   assigning equal CDF values for the subsets.

8. The method of claim 1, further comprising:
   initiating the boundaries of signal strength values of the subsets to evenly divide a space of the signal strength values into the subsets.

9. The method of claim 1, wherein checking the reset condition that is used to trigger the reset of the boundaries of signal strength values for clustering the entries of positioning data associated the wireless station into subsets further comprises:
   adding a plurality of positioning data to the entries of positioning data; and
   checking the reset condition after the addition of the plurality of positioning data.

10. The method of claim 2, wherein storing the updated boundaries of signal strength values further comprises:

storing the updated boundaries of signal strength values for the subsets in a wireless station information table.

11. An apparatus, comprising:
  a storage medium configured to provide a database of positioning data, each positioning data associating position information of a location with an identification of a wireless station for providing wireless connection at the location and a strength of a signal received by a wireless device at the location; and
  a processor configured to:
    cluster entries of positioning data into subsets, each subset defined by a lower boundary of signal strength value and an upper boundary of signal strength value of a plurality of boundaries of signal strength values, each signal strength value indicating the strength of the signal; and
    check a reset condition that is used to trigger a reset of the boundaries of signal strength values for clustering the entries of positioning data the subsets.

12. The apparatus of claim 11, wherein the processor is further configured to:
  update, when the reset condition is satisfied, one or more of the boundaries of signal strength values to re-allocate the entries of positioning data in the subsets in order to increase a population uniformity across the subsets;
  store the updated boundaries of signal strength values;
  select a subset of positioning data when a signal strength of a wireless device is within the updated boundaries of signal strength values of the subset in response to a position request to determine position information of the wireless device; and
  determine the position information of the wireless device based on the selected subset of positioning data.

13. The apparatus of claim 11, wherein the processor is further configured to do at least one of:
  comparing a standard deviation of the signal strength values in a subset with a threshold;
  comparing a number of positioning data in a subset to a threshold; and
  comparing a standard error of sample mean of the signal strength values in a subset to a threshold.

14. The apparatus of claim 11, wherein the processor is further configured to:
  update, when the reset condition is satisfied, one or more of the boundaries of signal strength values to re-allocate the entries of positioning data in the subsets in order to increase a population uniformity across the subsets;
  determine a new cumulative distribution function (CDF) value for a subset; and
  determine one or two boundaries for the subset to achieve the new CDF.

15. The apparatus of claim 14, wherein the processor is further configured to
  determine the new CDF value for the subset based on CDF values of other subsets and a tolerance.

16. The apparatus of claim 11, wherein the processor is further configured to:
  updating, when the reset condition is satisfied, one or more of the boundaries of signal strength values to re-allocate the entries of positioning data in the subsets in order to increase a population uniformity across the subsets;
  assign cumulative distribution function (CDF) values for the subsets; and
  determine the boundaries for the subsets to achieve the CDF values across the subsets.

17. The apparatus of claim 16, wherein the processor is further configured to
  assign equal CDF values for the subsets.

18. The apparatus of claim 11, wherein the processor is further configured to initiate the boundaries of signal strength values of the subsets to evenly divide a space of the signal strength values into the subsets.

19. The apparatus of claim 11, wherein the processor is further configured to:
  add a plurality of positioning data to the entries of positioning data; and
  check the reset condition after the addition of the plurality of positioning data.

20. The apparatus of claim 12, wherein the processor is further configured to
  store the updated boundaries of signal strength values for the subsets in a wireless station information table.

* * * * *